United States Patent
Heimberger et al.

(10) Patent No.: US 7,545,484 B2
(45) Date of Patent: Jun. 9, 2009

(54) METHOD AND DISTANCE DETECTING DEVICE FOR DETECTING THE PROJECTED DISTANCE BETWEEN A DISTANCE MEASURING DEVICE AND AN OBSTACLE

(75) Inventors: Markus Heimberger, Tamm (DE); Heinrich Gotzig, Heilbronn (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 250 days.

(21) Appl. No.: 10/574,229

(22) PCT Filed: Sep. 29, 2004

(86) PCT No.: PCT/EP2004/010867

§ 371 (c)(1),
(2), (4) Date: Mar. 8, 2007

(87) PCT Pub. No.: WO2005/033735

PCT Pub. Date: Apr. 14, 2005

(65) Prior Publication Data

US 2008/0015777 A1    Jan. 17, 2008

(30) Foreign Application Priority Data

Oct. 4, 2003    (DE) ................. 103 46 074

(51) Int. Cl.
*G01C 3/08*    (2006.01)
*G01S 13/00*    (2006.01)

(52) U.S. Cl. ........................ 356/4.01; 342/70

(58) Field of Classification Search ....... 356/4.01–5.15, 356/28; 342/70–72; 701/300, 301
See application file for complete search history.

(56) References Cited

U.S. PATENT DOCUMENTS

| 4,477,184 | A | | 10/1984 | Endo | |
|---|---|---|---|---|---|
| 5,675,720 | A | * | 10/1997 | Sato et al. | 345/419 |
| 6,085,151 | A | * | 7/2000 | Farmer et al. | 701/301 |
| 6,615,138 | B1 | * | 9/2003 | Schiffmann et al. | 701/301 |
| 7,283,212 | B2 | * | 10/2007 | Arita et al. | 356/5.01 |

FOREIGN PATENT DOCUMENTS

| DE | 43 33 357 | 4/1995 |
|---|---|---|
| DE | 101 51 965 | 5/2003 |

\* cited by examiner

*Primary Examiner*—Isam Alsomiri
(74) *Attorney, Agent, or Firm*—Paul Vincent

(57) ABSTRACT

The invention relates to method and a device for determining the projected distance between a distance measuring device and a nearest point on the surface of an obstacle, the projected distance between said point and the distance measuring device being fundamentally the shortest in relation to all points of the obstacle. The aim of the invention is to be able to calculate the current distance between the nearest point and the distance measuring device, when the point P is no longer inside the detection region of the distance measuring device. According to the invention, the calculation of the projected distance is based on information about the relative movement of the distance measuring device and the obstacle, and on a defined limiting distance.

9 Claims, 2 Drawing Sheets

METHOD AND DISTANCE DETECTING DEVICE FOR DETECTING THE PROJECTED DISTANCE BETWEEN A DISTANCE MEASURING DEVICE AND AN OBSTACLE

This application is the national stage of PCT/EP2004/010867 filed on Sep. 29, 2004 and also claims Paris Convention priority of DE 103 46 074.8 filed on Oct. 4, 2003.

BACKGROUND OF THE INVENTION

The invention concerns a method for detecting the projected distance between a distance measuring device, which is preferably installed in a vehicle, and an obstacle. The invention also concerns a computer program including a program code and a distance detecting device for performing this method.

Methods and devices of this type are known in the art. Any obstacle has one nearest point on the surface of the obstacle in the vicinity of the distance measuring device, having the shortest projected distance from the distance measuring device of all points on the obstacle. This shortest projected distance is detected by conventional methods and devices, when and for as long as the nearest point is within the detecting range of the distance measuring device. Distance measuring devices, which are installed e.g. in vehicles, with horizontal orientation and a conical detecting range, bear the risk that obstacles having a maximum height, which is smaller than the height of the installation position of the distance measuring device, disappear from the conical detecting range below a certain minimum separation.

Departing therefrom, it is the underlying purpose of the invention to provide a method for detecting the shortest projected distance between a distance measuring device and an obstacle, a computer program and a distance detecting device for performing this method, which permit calculation of the shortest projected distance even when this point is outside of the detecting range of the distance measuring device.

SUMMARY OF THE INVENTION

This object is achieved by the method claimed in the independent method claim. This method is characterized by the following steps: Storing a limit time when the nearest point of the obstacle disappears from the detecting range of the distance measuring means as the distance measuring device and the obstacle approach each other; storing a projected limit distance between the nearest point of the obstacle and the distance measuring device at the limit time; and detecting the projected distance between the nearest point of the obstacle and the distance measuring device, thereby taking into consideration the limit distance, the limit time and information about the relative motion between the distance measuring device and the obstacle as long as the nearest point of the obstacle is outside of the detecting range of the distance measuring device.

The claimed method advantageously permits calculation of the respectively shortest projected distance between the obstacle and the distance measuring device even when the nearest point on the surface of the obstacle is outside of the detecting range of the distance measuring device. This calculation can be performed in accordance with the invention when a limit distance, a limit time and information about the relative motion between the distance measuring device and the obstacle are known. The nearest point of the obstacle is that point on the surface of the obstacle which has the shortest projected distance from the distance measuring device of all points of the obstacle. Projected distance thereby designates the length of projection of the direct separation between the nearest point P and the distance measuring device along a horizontal line. The terms limit time and limit distance used in the present invention have the meanings defined in the previous paragraph.

The distance and, in particular, the projected distance between the nearest point P and the distance measuring device is advantageously determined on the basis of information about the position and, in particular, about the height of the nearest point above ground. This information about the position or height is determined e.g. by a distance detecting device as long as the nearest point of the obstacle is still within the detecting range of the distance measuring device.

Further advantageous embodiments of the method are the subject matter of the dependent claims.

The above-mentioned object of the invention is also achieved by a computer program including program code and a distance detecting device. The advantages of these two solutions correspond to the advantages mentioned above with respect to the claimed method.

BRIEF DESCRIPTION OF THE DRAWING

The description includes a total of two figures, wherein.

DESCRIPTION OF THE PREFERRED EMBODIMENT

Figure 1:
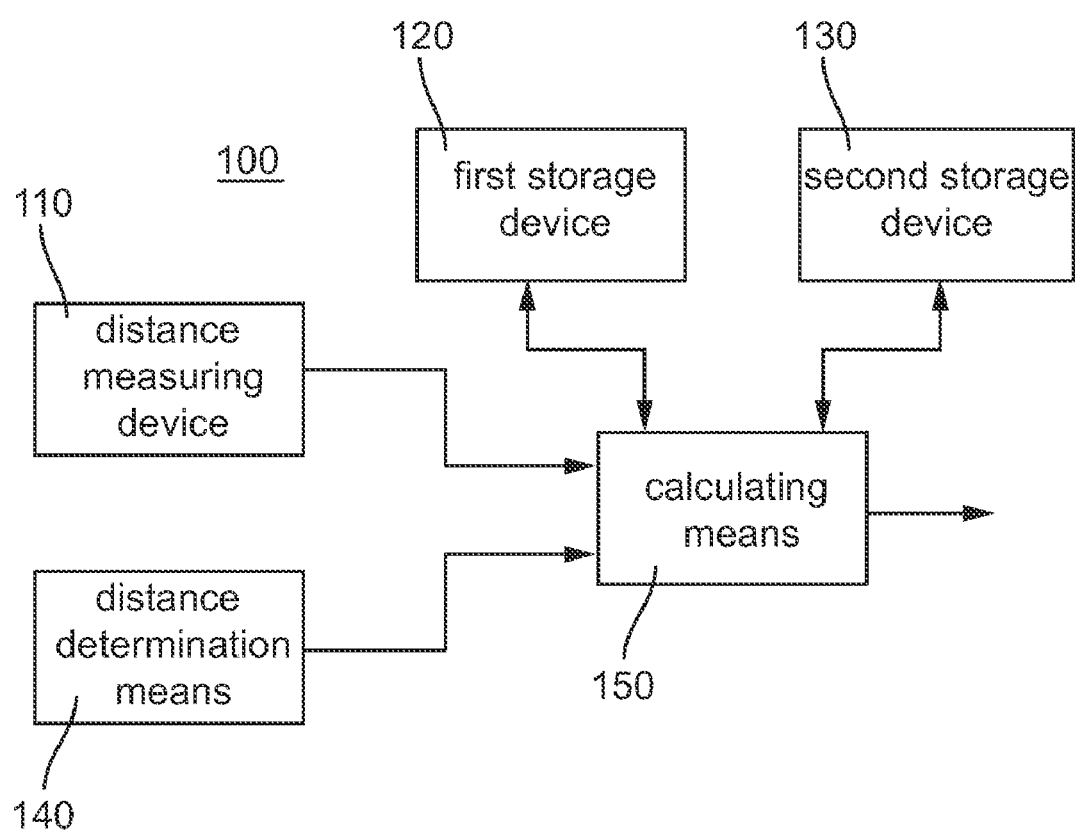
FIG. 1 shows the structure of an inventive distance detecting device.
Figure 2A:
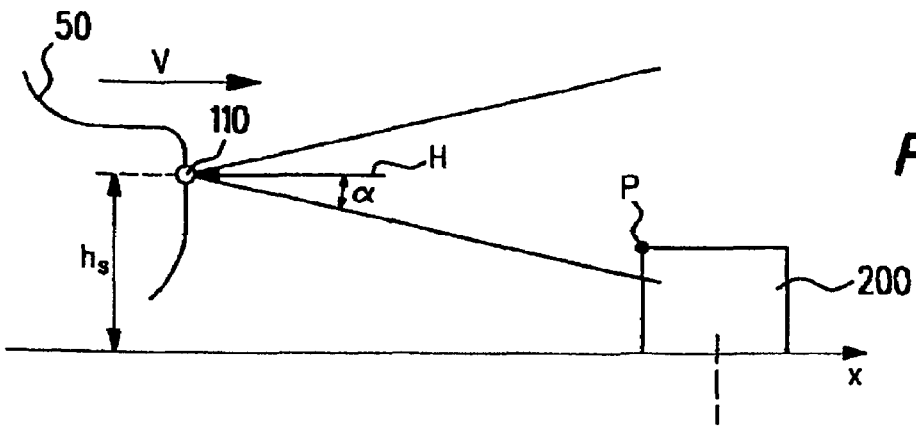
FIG. 2a shows detection of the distance between a nearest point P and a distance measuring device when the nearest point is within the detecting range of the distance detecting device.

The invention is explained in more detail below by embodiments with reference to the figures and their descriptions. FIG. 1 shows the structure of the inventive distance detecting device 100. It is preferably disposed in a vehicle 50 at a level of $h_s$ above ground or above a road (FIG. 2a). It comprises a distance measuring device 110, e.g. in the form of an ultrasound or radar sensor for detecting the distance between the distance measuring device 110 and an obstacle 200 in the vicinity of the distance measuring device 110. The invention is based on the assumption that the maximum height $h_p$ of the obstacle 200 above ground or above the road surface (FIG. 2b) is less than the height $h_s$ of the installation position of the distance measuring device 110 in the vehicle 50. This precondition must be met since only then it is ensured that a nearest point P of the obstacle 200 having the shortest projected distance of all points of the obstacle from the distance measuring device 110, can lie between the nearest point and the distance measuring device 110 and also within or outside of the detecting range of the distance measuring device, depending on the size of the actual distance.

The distance detecting device 100 also comprises a first storage element 120 for storing a limit time when the nearest point P of the obstacle 200 exits the detecting range of the distance measuring device 110 as the distance measuring device 110 approaches the obstacle 200. The distance detecting device 100 also comprises a second storage element for storing a projected limit distance $d_{Gr}$ between the nearest point P of the obstacle 200 and the distance measuring device 110 at the limit time.

The distance detecting device moreover comprises a distance determination means 140 to detect distance information about relative motion between the distance measuring device 110 and the obstacle 200, in particular, after the limit time, i.e. when the nearest point P of the obstacle 200 is outside of the detecting range of the distance measuring device 110. This distance determination means is preferably installed in a vehicle 50 together with all of the components of the distance detecting device 100 described above. This is especially reasonable when the vehicle is movable and an immovable stationary obstacle is detected. The overall distance detecting device and, in particular, the overall distance determination means may be disposed in the obstacle 200 or be distributed between the vehicle 50 and the obstacle 200. It is only important that the distance determination means is designed and arranged to detect relative motion between the distance measuring device 110 and the obstacle 200 irrespective of whether the distance measuring device 110, the obstacle 200 or both move relative to each other. The distance detecting device finally also comprises a calculating means 150 for detecting the projected distance d between the nearest point P of the obstacle 200 and the distance measuring device 100. This calculating means 150 is designed to calculate this projected distance, thereby taking into consideration the limit distance $d_{Gr}$ and information about the relative motion between the distance measuring device and the obstacle. In order to optimize the calculation, the limit time may also be taken into consideration.

The function of the distance detecting device 100 shown in FIG. 1 is described in detail below with reference to the embodiments of FIGS. 2a, 2b, and 2c.

Figure 2B:
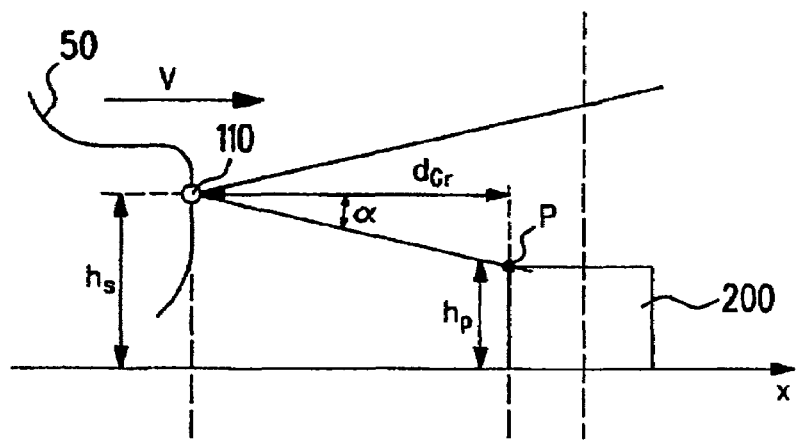
FIG. 2b shows calculation of the projected distance between the nearest point P and the distance measuring device when the nearest point is at the edge of the detecting range.
Figure 2C:
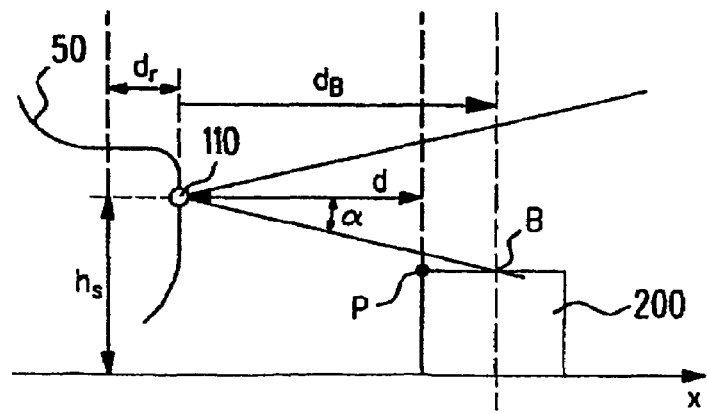
FIG. 2c shows determination of the projected distance between the nearest point P and the distance detecting device if the nearest point P is outside of the detecting range of the distance detecting device.

In order to illustrate the method, we assume that the vehicle 50 is travelling towards an immovable, i.e. stationary obstacle 200 at a speed V (see examples of FIGS. 2a through 2c). This is clearly only one particular kind of relative motion. Other relative motions include: only the obstacle 200 moves and the vehicle 50 does not move, or both the vehicle 50 and the obstacle 200 are moving. In FIG. 2, the installation height of the distance measuring device 110 above the road is designated with $h_s$. The point on the surface of the obstacle 200 having the shortest projected distance from the distance measuring device 110 is designated with P. The height of this point P above ground or above the road is designated with $h_p$.

FIG. 2a shows a situation, wherein the distance between the distance measuring device 110 and the nearest point P of the obstacle 200 is sufficiently large that the nearest point P is within the detecting range of the distance measuring device 110. Suitable distance information can then be easily determined, as originally envisioned.

As the vehicle 50 moves towards the presumably stationary obstacle 200 at a speed V, the nearest point P moves increasingly out of the center of the detecting range of the distance measuring device 110 until it finally lies on its border as indicated in FIG. 2b. In accordance with the invention, the time at which this situation occurs is called the limit time. The projected distance between the nearest point P and the distance measuring device 110 at that time is called limit separation. The detection and storage of these limit values is essential for the present invention, since when the nearest point P is no longer within the detecting range of the distance measuring device 110, the distance between the nearest point P and the distance measuring device 110 can only be calculated when these two limit values are known. The detecting range of most distance measuring devices is defined by the position and the opening angle of their radiation cone. When the portion a of the opening angle of the distance measuring device 110, which is below the horizontal H, and the difference between the installation eight $h_s$ of the distance measuring device 110 and the height $h_p$ of the nearest point P are known, the limit distance $d_{Gr}$ at the limit time can be calculated according to the following formula (1)

$$d_{Gr} = \frac{\tan(\alpha)}{h_s - h_p} \qquad (1)$$

A further approximation is obtained when e.g. the vehicle 50 continues to move towards the obstacle 200. This relative motion is shown in FIG. 2c in the form of the distance $d_r$ which is determined by the distance determination means 140. The magnitude of this relative motion is of interest, in particular, starting from the limit time, at which the nearest point P of the obstacle 200 is no longer in the detecting range of the distance measuring device 110. The latter is indicated in FIG. 2c, wherein the nearest point P is no longer within the cone limited by the angle α. In the situation shown in FIG. 2c, the calculating means 150 calculates the projected distance d between the nearest point P of the obstacle 200 and the distance measuring device 110 in accordance with the invention through simple subtraction of the relative distance dr from the limit distance $d_{Gr}$. This calculation method is valid irrespective of the speed at which the obstacle moves, after detection of its nearest point, completely out of the detecting range of the distance measuring device 110. This occurs sooner for narrow obstacles than for wide obstacles.

In case of wide obstacles (obstacle 200 in FIG. 2c), parts of the obstacle 200 are still detected even when the nearest point P is no longer in the detecting range. This is indicated in FIG. 2c, as the radiation cone of the distance measuring device 110 contacts the obstacle 200 on its upper surface at point B. An interpretation of the projected distance $d_B$ of this point as being the shortest distance between the obstacle 200 and the distance measuring device 110 would be wrong as is shown by a comparison with the correct projected distance d (also shown in FIG. 2c), and could result in an undesired collision between the vehicle 50 and the obstacle 200. The distance d is the actual shortest distance.

The above described and claimed method for detecting the projected distance between a distance measuring device 110 and an obstacle 200 in accordance with the invention is preferably realized in the form of a computer program which may run on a suitable computer, in particular, a microprocessor. The computer program may optionally be stored on a computer-readable data carrier together with further computer programs. The data carrier may be a disc, a compact disc (so-called CD), a flash memory or the like. The computer program stored on the data carrier may be transmitted and sold to a customer as a product. The computer program may also be transmitted and sold as a product to a customer without the aid of a data carrier, e.g. via an electronic communications network. The communications network may e.g. be the Internet.

We claim:

1. A method for detecting a projected distance between a distance measuring device and an obstacle, the obstacle having a maximum height which is smaller than a height ($h_s$) of the distance measuring device, the obstacle also having a predetermined nearest point (P) on a surface thereof having a shortest projected distance (d) from the distance measuring device of all points of the obstacle, the method comprising the steps of:

a) storing a projected limit distance ($d_{Gr}$) between the nearest point (P) of the obstacle and the distance measuring device at a limit time at which the nearest point (P) of the obstacle moves out of a detecting range of the distance measuring device, as the distance measuring device and the obstacle approach each other; and b) evaluating the limit distance ($d_{Gr}$) and additional information concerning a relative motion between the distance measuring device and the obstacle to determine projected distances (d) between the nearest point (P) of the obstacle and the distance measuring device as long as the nearest point (P) is outside of the detecting range of the distance measuring device.

2. The method of claim 1, wherein the position and the height ($h_p$) of the nearest point (P) of the obstacle are determined using information provided by the distance measuring device as long as the nearest point (P) of the obstacle is within the detecting range of the distance measuring device.

3. The method of claim 1, further comprising determining the distance between the nearest point (P) and the distance measuring device using information provided by the distance measuring device as long as the nearest point (P) of the obstacle is within the detecting range of the distance measuring device.

4. The method of claim 1, wherein the detecting range is substantially defined by an opening angle of the distance measuring device, and the limit distance ($d_{Gr}$) for the obstacle, having a height ($h_p$) at the nearest point above ground corresponding to the maximum total height of the obstacle, is calculated according to the following formula:

$$d_{Gr} = \frac{\tan(\alpha)}{h_s - h_p}$$

wherein $h_s$ is a height of the distance measuring device above ground; and $\alpha$ is a portion of the opening angle of the distance measuring device below the horizontal.

5. The method of claim 1, wherein the distance measuring device is installed on a vehicle.

6. A computer program including program code embodied in a computer readable medium for a distance detecting device, the program code when executed being structured to carry out the method of claim 1.

7. A distance detecting device, the device comprising:

means for detecting a distance between the distance measuring device and an obstacle in a vicinity of the distance measuring device, the obstacle having a maximum height which is smaller than a height of the distance measuring device, the obstacle also having a known nearest point which has a shortest projected distance of all points of the obstacle from the distance measuring device;

means for storing a projected limit distance between the nearest point (P) of the obstacle and the distance measuring device at a limit time at which the nearest point (P) of the obstacle moves out of a detecting range of the distance measuring device, as the distance measuring device and the obstacle approach each other;

a distance determination means for analysing distance information during relative motion between the distance measuring device and the obstacle; and means for calculating a projected distance (d) between the nearest point of the obstacle and the distance measuring device, thereby taking into consideration the limit distance ($d_{Gr}$) and information provided by the distance determination means.

8. The device of claim 7, wherein the device is structured for use on a vehicle.

9. The device of claim 7, wherein said distance determination means acts when the nearest point (P) of the obstacle is outside of a detecting range of the distance measuring device.

* * * * *